United States Patent [19]

Smith

[11] Patent Number: 4,520,233
[45] Date of Patent: May 28, 1985

[54] TELEPHONE LINE SECURITY APPARATUS

[75] Inventor: James W. Smith, San Jose, Calif.

[73] Assignee: Omnicom Engineering, San Jose, Calif.

[21] Appl. No.: 369,289

[22] Filed: Apr. 16, 1982

[51] Int. Cl.³ .......................... H04L 9/00; H04K 1/00
[52] U.S. Cl. ................................ 179/1.5 R; 178/22.08
[58] Field of Search .............. 179/1.5 R, 2 DP, 18 D; 370/85, 94; 178/22.08

[56] References Cited

U.S. PATENT DOCUMENTS

| | | | |
|---|---|---|---|
| 4,154,988 | 5/1979 | Fechalos et al. | 179/18 D |
| 4,182,933 | 1/1980 | Rosenblum | 179/1.5 R |
| 4,277,649 | 7/1981 | Sheinbein | 179/18 D |
| 4,313,176 | 1/1982 | Cecil | 179/2 DP |
| 4,369,339 | 1/1983 | Castro et al. | 179/18 D |
| 4,402,073 | 8/1983 | Hammond | 370/85 |
| 4,430,728 | 2/1984 | Beitel et al. | 179/1.5 R |

Primary Examiner—Sal Cangialosi
Attorney, Agent, or Firm—Townsend and Townsend

[57] ABSTRACT

A telephone security apparatus placed at a subscriber station intercepts and screens incoming calls direct to a terminal through a modem. The security apparatus prevents completion of a connection to the terminal equipment unless the incoming call provides a predefined access code and the call is found to have been made from the remote subscriber station to which the predefined access code has been assigned. The security apparatus automatically dials back the subscriber station corresponding to the access code given on the incoming call. A microprocessor-based embodiment is described.

7 Claims, 3 Drawing Figures

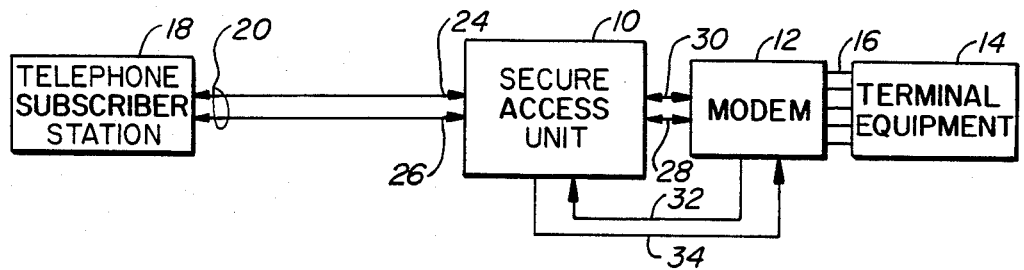
FIG._1.
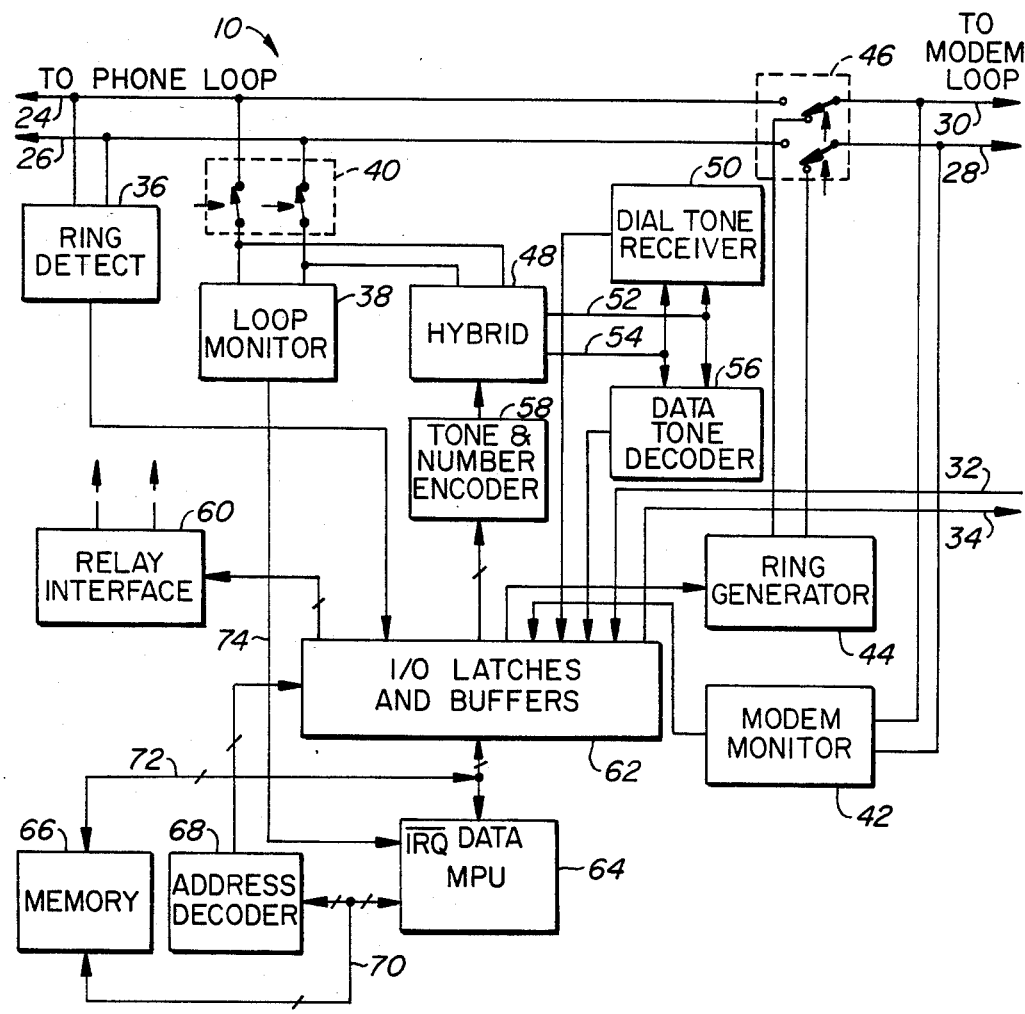
FIG._2.

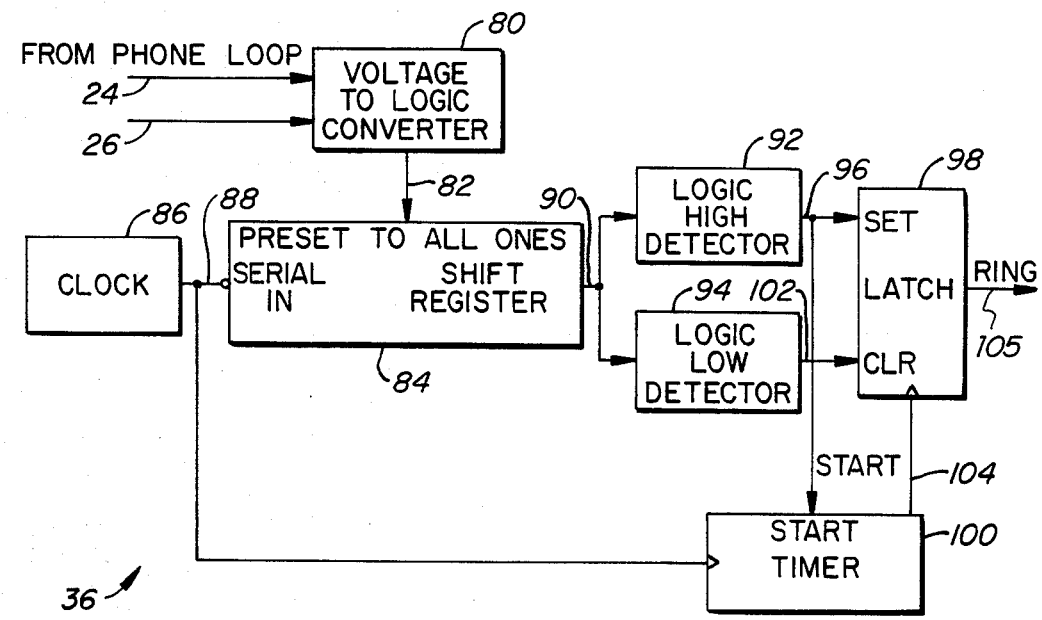
FIG._3.

TELEPHONE LINE SECURITY APPARATUS

BACKGROUND OF INVENTION

1. Field of Invention

This invention relates to a security device intended to be used between any remote data access device and the public switched telephone network. The security device may be used with a private automatic branch exchange or central office switching system by coupling to a remote programming and maintenance port and particularly to dial up computer connections.

In normal applications the security device is connected betwen a telephone network and telephone loop and a modulator-demodulator (modem) coupled to local automatic dial-up terminal equipment.

There exists a potentially acute problem with respect to security of data bases which are coupled to public telephone lines through automatic dial-up equipment. Under normal circumstances the only security is by means of access codes and user identification codes. The security access codes can be deciphered with relative ease in many instances by use of a computer to test for a correct code. Once the correct code has been identified, the security of a data base can be breached, allowing unauthorized access.

What is therefore needed is a device for enhancing the security of data bases accessible by public telephone lines.

2. Description of the Prior Art

A device known as a service observing unit is manufactured by Teltone Corporation of Kirkland, Washington. The device utilizes a dial back technique for secure access to a data base. The device, however, requires the use of two telephone lines for normal operation, namely an incoming line for connection of the originating call and a second line which is used for the outgoing call back to the calling party.

A number of automatic dialing devices are known to the art. Such devices are normally used for automatic calling operations, for remote billing equipment and for computer to computer data transfers.

SUMMARY OF THE INVENTION

According to the invention, a telephone security apparatus placed at a subscriber station intercepts and screens incoming calls directed through a modem to terminal equipment such as a computer. The security apparatus prevents completion of a connection to the terminal equipment unless the incoming call provides a predefined access code and the call is found to have been made from the subscriber station to which the predefined access code is assigned. The security apparatus automatically dials back the subscriber station corresponding to the access code given on the incoming call. A security apparatus according to the invention is coupled between the telephone loop and the terminal equipment and includes capabilities for controlling the calling mode of the terminal equipment. A preferred embodiment of the invention is a microprocessor-based device which is responsive to an incoming ring signal, dial signal and dual tone multiple frequency data signals and is capable of detecting a Forward Disconnect signal on the phone loop prior to an automatic dial back of a telephone number corresponding to a received access code.

BRIEF DESCRIPTION OF THE DRAWINGS

The invention will be better understood by reference to the following detailed description taken in connection with the accompanying drawings.

FIG. 1 is a block diagram of a telephone communication loop between a telephone subscriber station desiring access to terminal equipment.

FIG. 2 is a block diagram of a specific embodiment of a secure access unit according to the invention.

FIG. 3 is a block diagram of a ring detector according to the invention.

DETAILED DESCRIPTION OF SPECIFIC EMBODIMENTS

In FIG. 1 there is shown a secure access unit 10 coupled to a modem 12 which in turn is coupled to terminal equipment 14 by means of data and control connections 16. A remote subscriber station 18 is coupled over a switched, e.g., public, telephone loop 20 to the secure access unit 10. The switched telephone loop consists of a telephone tip line 24 and a telephone ring line 26. According to the invention, only one telephone line is required for proper operation of the secure access unit 10. The modem 12 is coupled to the secure access unit 10 through a modem tip line 28 and modem ring line 30 for carrying data signals. The modem 12 is also connected to the secure access unit 10 by a pair of control leads normally denominated the C lead 32 for providing control signals to the secure access unit 10 and the D1 lead 34 for receiving control signals.

In FIG. 2, the secure access unit 10 in a specific embodiment is shown in greater detail. The secure access unit 10 comprises a ring detector 36, a phone loop monitor 38 switchably coupled to the phone loop 24, 26 by first relay set 40, a loop monitor 42 coupled across the modem loop 28, 30, and a ring generator 44 having an output coupled to the modem loop 28, 30 through a second relay set 46. The second relay set 46 provides the direct switched connection between the modem loop 28, 30 and the phone loop 24, 26.

The secure access unit further includes a two wire to four wire hybrid circuit 48 coupled across the phone loop 24, 26 through first relay set 40, a dial tone receiver 50 coupled across an output loop 52, 54 of the hybrid 48, a data tone decoder 56, such as a dual tone multifrequency decoder and receiver, coupled across the hybrid output loop 52, 54, a tone and phone number encoder 58, such as a dual tone multiple frequency tone encoder, having an output coupled into the hybrid 48, and a relay controller or interface 60 whose outputs are coupled to the first relay set 40 and second relay set 46.

The secure access unit 10 further includes input-output latches and buffers 62 to which various elements are connected in order to provide assured logic signal interconnection with a microprocessor unit 64 and associated digital memory 66. The output signals are coupled to the relay interface 60, the encoder 58, ring generator 44 and D1 line 34 to the modem. Input logic signals are received from the ring detector 36, modem monitor 42, dial tone receiver 50, data tone decoder 56, and the associated modem via the C line 32. The microprocessor unit 64 communicates with its input-output devices via an address decoder 68 to which selected lines of an address bus 70 are coupled. A bidirectional data bus 72 is coupled to the data terminals of the microprocessor unit 64, the input-output latches and buffers 62, and the memory 66. The microprocessor unit 64 and associated memory 66 cooperate to channel data, compute and compare access codes received through the data tone encoder 56, control all timing functions and to provide self test and diagnosis. The microprocessor unit 64 is subject to an interrupt request via a control line 74 which is the output of the loop monitor 38.

Turning to FIG. 3, there is shown a ring detector 36 according to the invention. The tip line 24 and ring line 26 are coupled to a voltage-to-logic converter 80 which is operative to convert the voltage level of a ring signal to a logic one for the duration of such a voltage level on the phone loop lines. An output line 82 of the converter 80 is coupled to a shift register 84 at an input which presets the shift register to all logic one values. A clock 86 is coupled on a signal line 88 to a serial input terminal of the shift register 84. The clock 86 is operative to provide logic zero values at the serial input at each clock pulse. The shift register 84 is operative as a time delay device to place a logic zero level at a register output 90 a fixed number of clock pulses after a set signal on line 82. The line 90 out of the shift register 84 is coupled to the input of a logic high detector 92 and the input of a logic low detector 94. A preliminary ring output line 96 of the logic high detector 92 is coupled to the preset input of a latch 98 and to a start input of a timer 100. A "no ring" signal line 102 is coupled to the clear input of latch 98. A time out line 104 is coupled from the timer 100 to the clock input of latch 98.

In operation, the shift register 84 is operative to detect voltage logic pulses on line 82 in the high logic state. When the high logic state appears at output 90, the logic high detector 92 presents the latch 98 with a preliminary ring signal and starts timer 100. If a logic low is detected on line 90 prior to the timing out of the timer 100, the logic low detector output line 102 is set to clear the latch 98 upon occurrence of a clock signal on line 104. Upon time out, time out line 104 clocks the latch to generate an output signal. A logic high on ring line 105 represents a positive ring detect and a logic low indicates the absence of a ring. If the timer 100 times out before a logic low is detected by logic low detector 94, the set value presented to the latch 98 from logic high detector 92 is clocked out to indicate the presence of a ring signal on the phone loop. This circuit assures that false pulses are not detected as telephone ring signals.

In a preferred embodiment, the secure access unit 10 operates as follows: Placed between the switch telephone loop 20 and modem 12, the ring detector 36 monitors for an incoming ring signal. Once such a signal is received, the microprocessor unit 64 is signaled and may perform a self check to assure that all circuts are functioning properly. The ring detector 36 then monitors for a second ring signal. If the secure access unit 10 fails to detect the proper timing in the second ring signal or fails the self check test, the secure access unit 10 returns to its idle state and does not respond to the telephone call.

If the secure access unit 10 detects a valid second ring signal, it responds by going to a normal off hook state and begins by monitoring the phone loop through loop monitor 38 and hybrid 48. No acknowledge signals are provided over the phone loop for a time out period, generally of approximately twenty-three seconds, during which time the data tone decoder 56 monitors for an access code. In the specific embodiment, the data tone decoder 56 is a dual tone multifrequency decoder which accpets an access code of up to five digits corresponding to five key depressions on a calling party's touch tone telephone. These decoded signals are passed through the buffer 62 to the microprocessor unit 64, where the signals are compared with preselected access codes stored in memory 66. If an invalid sequence of digits is detected, the microprocessor unit 64 enters an abort state wherein the system scans for approximately twenty-three seconds waiting for an automatic time out and disconnect. If a valid sequence of digits is detected, the microprocessor unit 64 enters an acknowledge state wherein the tone and number encoder 58 generates a one second tone to indicate the reception of a valid access code. The unit 10 then awaits a Forward Disconnect signal from the switched telephone network. A Forward Disconnect signal indicates that the calling party has hung up. If the Forward Disconnect signal does not occur within forty seconds after the acknowledge tone is sent, the secure access unit 10 will attempt to force a disconnect by idling the line for a further thirty seconds. Once the secure access unit 10 has insured that the calling party has hung up and the telephone line is idle, the microprocessor unit 64 goes "on hook" and enters a dial back operating state.

The dial back operating state begins with a five second on hook period followed by an off hook operation. The five second on hook period is restarted each time an incoming ring signal is detected during the interval. This feature prevents an unwanted ring-trip condition during the dial back period. During the off hook period, the dial tone receiver 50 will monitor for a network dial tone. Should either the dial tone be detected or the five second period be exceeded, the tone and number decoder 58 will be stimulated to dial back a stored telephone number corresponding to the previously received valid access code. Under normal conditions, the secure access unit 10 will dial back the original calling party. If the call originated from other than the original calling party, then, according to the invention, the call will not be returned to the original calling party. This assures that only authorized access codes and telephone numbers have access to the terminal equipment.

Once the secure access unit 10 has completed a dialing sequence it enters a connection state. While in the connection state the data tone encoder 56 monitors the phone loop for an expected sequence called a connection code. If the connection code is not received within a predetermined time after the secure access unit 10 completes its dialing sequence, the microprocessor unit 64 will time out, disconnect the telephone line and return to the idle state. The connection code is used to set the mode of the system. Specifically, the connection code can indicate that the modem 12 is to operate in either the answer mode or in the originate mode. To connect the modem 12 in the originate mode, the microprocessor unit 64 responds during the connection state through D1 interface line 34 to cause the modem to connect to the phone loop. When the modem 12 responds by going off hook, as detected through the modem C line 32, the microprocessor unit 64 causes the relay 46 to switch and connect the modem loop to the phone loop.

The secure access unit 10 then causes the relay 46 to switch thereby to connect the modem loop to the phone loop. The unit 10 continues to monitor the line through the modem monitor 42 until the line 20 goes idle and forces the secure access unit 10 to disconnect the phone loop and return to its idle state. Optionally an abort timer may be provided to cause automatic disconnection if necessary.

To connect the modem 12 in the answer mode, the microprocessor unit 64 causes the ring generator 44 to ring the modem 12 as though as incoming call were being received.

The microprocessor unit 64 according to the invention may be any number of different microprocessors such as a type 6505 commonly used for process control. The 6505 is a microprocessor designed for direct addressing of devices as if devices were located in specific locations in memory. It includes an address bus port, a data bus port, input and output clocks, a ready terminal, a reset input, and a read/write output terminal.

The invention has now been explained with reference to specific embodiments. Other embodiments will be apparent to those of ordinary skill in this art. It is therefore not intended that this invention be limited except as indicated by the appended claims.

I claim:

1. A telephone call-in security apparatus for controlling connections between a single telephone line and a telephone modulator-demodulator (modem) apparatus at a location remote from a telephone switching station and connected to a publically accessible switched telephone network, said security apparatus comprising:
   means coupled to said telephone line for detecting ring signals;
   means responsive to said ring signal detecting means for connecting said apparatus to said telephone line in a two-way telephone connection;
   means coupled to said telephone line through said connection means for detecting tone encoded signals of an incoming telephone call;
   means operative to check said detected tone encoded signal for an authorized access code for initiating a call-back sequence to a telephone terminal corresponding to said access code, said call-back sequence initiating means including means for detecting for a forward disconnect condition from the switched telephone network; and
   means responsive to a two-way telephone line connection sequence subsequent to said call-back sequence for coupling said telephone line to said modem.

2. The apparatus according to claim 1 wherein said cal-back initiating means further includes means operative to generate a forced disconnect condition in the absence of detection of a forward disconnect condition.

3. The apparatus according to claim 1 wherein said coupling means is operative to cause said modem to function in a call-originate mode following said call-back sequence.

4. The apparatus according to claim 1 wherein said coupling means is operative to cause said modem to function in a call-answer mode following said call-back sequence.

5. The apparatus according to claim 1 further including means for sending and detecting self-originated telephone loop control signals and modem line control signals for use in self-testing said apparatus.

6. The apparatus according to claim 1 further including hybrid means, said hybrid means being coupled to said telephone loop and being operative to both transmit and receive tone encoded signals on a common telephone loop and including means for suppressing feedback of transmitted signals to prevent overload of receive circuitry.

7. The apparatus according to claim 1 wherein said ring detecting means comprises:
   a shift register coupled to detect voltage pulses of a first binary state;
   means for clocking in pulses of a second opposite binary state to said shift register, said clocking means being operative to supply said second pulses for a fixed maximum time duration; and
   means coupled to said shift register and operative to detect the absence of said second binary state pulses during a predetermined period of time following first detection of said first binary pulses thereby to indicate the presence of ring signals.

* * * * *